Aug. 10, 1965  C. L. SCHWAB  3,199,648
FLUID TRANSFER TYPE CLUTCH ACTUATOR
Filed Nov. 26, 1963  2 Sheets-Sheet 1

Inventor
Charles L. Schwab

Aug. 10, 1965 C. L. SCHWAB 3,199,648
FLUID TRANSFER TYPE CLUTCH ACTUATOR
Filed Nov. 26, 1963 2 Sheets-Sheet 2

Inventor
Charles L. Schwab

3,199,648
FLUID TRANSFER TYPE CLUTCH ACTUATOR
Charles L. Schwab, Wauwatosa, Wis., assignor to Allis-Chalmers Manufacturing Company, Milwaukee, Wis.
Filed Nov. 26, 1963, Ser. No. 325,843
9 Claims. (Cl. 192—87)

This invention relates to a double acting fluid transfer type clutch actuator.

It is an object of the present invention to provide an improved fluid transfer type clutch actuator wherein the effect of centrifugal force upon the fluid being transferred is minimized.

It is a further object of this invention to provide a fluid transfer type double acting clutch actuator which gives improved performance, is easily manufactured, and is reliable in operation.

It is a further object of this invention to provide a double acting fluid transfer type actuator for a pair of axially spaced clutches interposed between a shaft and gearing mounted thereon wherein fluid is transferred from one end of the actuator to the other through the actuating cylinder.

These and other objects and advantages of this invention will be apparent to those familiar with the art upon reading the following description in conjunction with the drawings in which.

Figure 1:
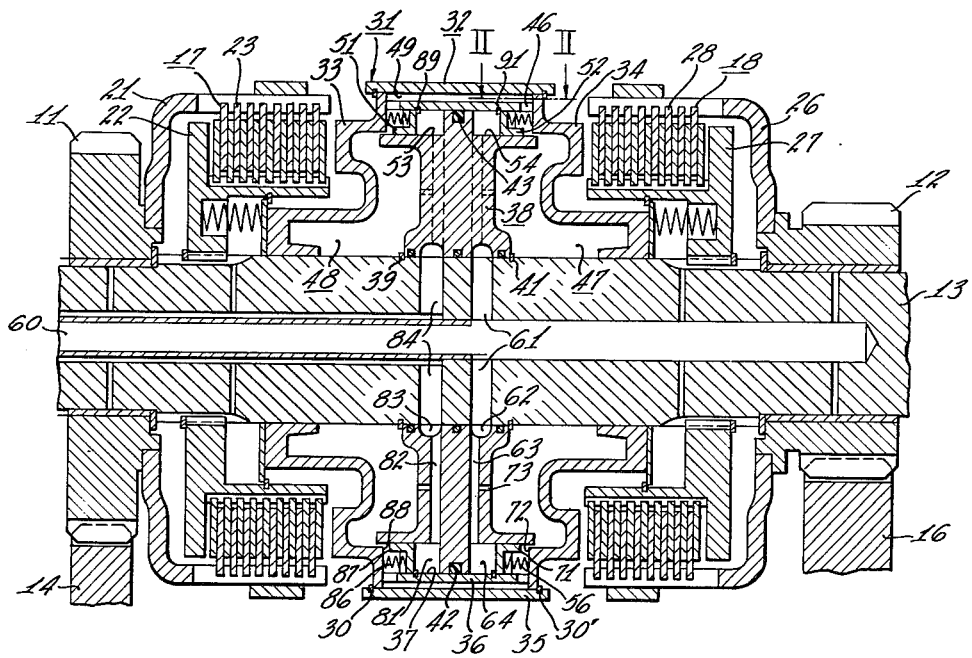
FIG. 1 is a section view of a double acting clutch actuator incorporating the present invention.

Referring to FIG. 1, a pair of axially spaced spur gears 11, 12 are rotatably mounted on a transmission shaft 13 and are in mesh with gears 14, 16 carried by another transmission shaft, not shown. A pair of axially spaced transmission clutches 17, 18 are employed to selectively connect the gears 11 and 12 to the transmission shaft 13. Clutch 17 includes an outer drum 21 which is welded to gear 11, an inner drum 22 which is splined to the shaft 13, and a clutch pack 23 made up of a plurality of disks of conventional construction. Transmission clutch 18 likewise includes an outer drum 26 welded to gear 12, an inner drum 27 splined to the shaft 13 and a clutch pack 28.

A double acting hydraulic actuator 31 is operatively interposed between the transmission clutches 17 and 18. The actuator 31 includes the cylinder structure 32 which has axially opposite end portions or ends 33, 34 in confronting relation to the clutch packs 23, 28, respectively. The piston members or ends 33, 34 are secured by snap rings 30, 30' to a radially outer cylinder 35. A cylindrical wall 36 is disposed within the cylinder 35 and presents a cylindrical face 37 which is in fluid sealing relation with a reaction member 38. Reaction member 38 is mounted coaxially on the shaft 13 and is secured against axial movement relative thereto by a pair of snap rings 39, 41. Sealing means in the form of an O-ring 42 is provided in a groove 43 in the actuator 38, to insure a sliding fluid sealing relationship between the inner cylinder or cylinder wall 36 and the reaction member 38. A pair of piston elements in the form of annular pistons 51, 52 are interposed between the cylindrical face 37 and a pair of axially spaced cylindrical surfaces 53, 54 formed on axially opposite sides of the sealing means 42. The pistons separate the large pressure chambers 47, 48 from the small pressure chambers 81, 64 at opposite ends of the cylinder structure 32.

Figure 2:
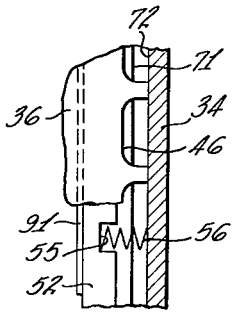
FIG. 2 is a section view taken along the line II—II in FIG. 1.

Referring also to FIG. 2, the cylindrical wall 36 has a plurality of recesses 46 formed in its axially opposite ends to permit fluid to pass between the large pressure chambers 47, 48 by way of the axially extending fluid transfer passage 49 defined by the radial space between the inner and outer cylinders 35, 36.

As shown in FIGS. 1 and 2, biasing means in the form of a plurality of coil springs 56 are positioned in suitable pockets 55 and disposed between the end portions 33, 34 and the pistons 51, 52 to bias the latter to their neutral or retracted positions in which illustrated, wherein fluid transfer may occur between the large pressure chambers 47, 48 through the fluid transfer passage 49. The fluid flow through passage 49 passes through the axial space between the pistons 51, 52, and the end portions 33, 34 of the cylinder structure 32. The flow transfer passage 49 is independent of the reaction member 38 and is at the circumferentially outermost position in the actuator. Thus fluid transfer between the large chambers 47, 48 requires the least possible effort to overcome the effect of centrifugal force on the actuating fluid.

When the operator desires to engage the clutch 18, he operates hydraulic controls, not shown, to direct pressure fluid through fluid supply passages 60, 61 in the shaft 13 to an annular recess 62 in reaction member 38. The annular recess 62 feeds a plurality of radially extending fluid supply passages 63 connected at their radially outer ends to a small annular fluid pressure chamber 64 defined by reaction member 38, inner cylinder 36 and piston 52.

Force is transmitted by the annular piston element 52 to the end portion 34 of the cylinder structure 32 through the plurality of circumferentially spaced coil springs 56, to move the end portion 34 into engagement with the clutch pack 28 of the clutch 18. Upon the end portion 34 engaging the clutch pack 28, fluid pressure quickly builds up in the small pressure chamber 64 to the extent that springs 56 are compressed and the complementary annular sealing surfaces 71, 72 on the piston 52 and interior end surface of the cylinder end portion 34 are brought into fluid sealing engagement. In this fluid sealing position of the piston 52, fluid transfer between the large pressure chambers 47, 48 will be interrupted, and the large pressure chamber 47 will be brought up to the same pressure as small chamber 64 by flow of pressure fluid through restricted opening or passage 73. The fluid in the small pressure chamber 81 defined by reaction member 38, inner cylinder 36 and piston 51, will flow to the low pressure side of the hydraulic fluid supply system through fluid supply passage 82 in reaction member 38, recess 83, and passage means 84 formed in shaft 13.

Similarly, when it is desired to engage clutch 17, the end portion 33 of the cylinder structure 32 may be brought into engagement with the clutch pack 23 by pressurizing small annular chamber 81 which causes piston 51 to move the cylinder structure 32 to the left by force transmitted through a plurality of circumferentially spaced coil springs 86 interposed between the annular piston 51 and the end portion 33. Upon engagement of the clutch pack 23 the pressure builds up rapidly in chamber 81 to a pressure causing relative movement between the piston 51 and the outer cylinder 35. This movement brings axially confronting annular sealing surfaces 87, 88 into fluid sealing engagement with one another, thereby cutting off fluid transfer through the fluid transfer passage means including passage 49 defined by the cylinder 32, pistons 51 and inner cylinder wall 36. A pair of snap rings 89, 91 are provided in the inner cylindrical wall 36 to properly position the pistons 51, 52 in their neutral or retracted positions shown in FIG. 1.

Figure 3:
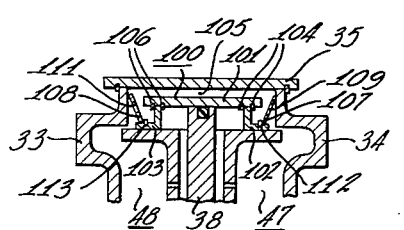
FIG. 3 is a partial section view of a second embodiment of the present invention.

Referring to FIG. 3, a radially inner cylinder 101 is employed in place of the cylindrical wall 36 shown in FIGS. 1 and 2, and it will be noted that cylindrical cylinder 101 is movable axially with the pistons 102, 103 secured to each end thereof by snap rings 104, 106. The inner cylinder and piston assembly 100 is held in the illustrated neutral position, in which fluid transfer is permitted between the large chambers 47, 48 by biasing means in the form of a pair of Belleville washers 107, 108. The washers 107, 108 have a plurality of circumferentially spaced openings 109, 111 to permit fluid flow therethrough so as not to interfere with flow through fluid transfer passage 105. Snap rings 112, 113 correctly position the Belleville washers 107, 108 on the annular pistons 102, 103.

Figure 4:
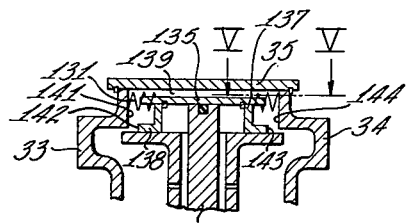
FIG. 4 is a section view showing a third embodiment of this invention.
Figure 5:
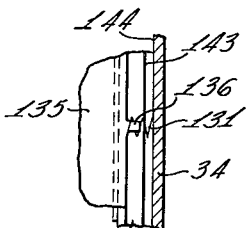
FIG. 5 is a section view taken along the line V—V in FIG. 4.

The variation of the present invention shown in FIG. 4 is similar to the construction illustrated in FIG. 3. In place of the Belleville washers employed in FIG. 3, a plurality of circumferentially spaced coil springs 131 are placed between the ends of the inner cylinder assembly 135 and the ends 33, 34 of the cylinder 35. The springs 131 resiliently bias the pistons 137, 138 to their illustrated neutral position in which fluid transfer through passage 139 is permitted. As shown in FIG. 5, the springs 131 are held in place by projections 136 on the inner cylinder 135 which project into the center of the coil springs 131. The projections 136 are not so long as to interfere with engagement of complementary sealing surfaces 141, 142 and 143, 144.

Figure 6:
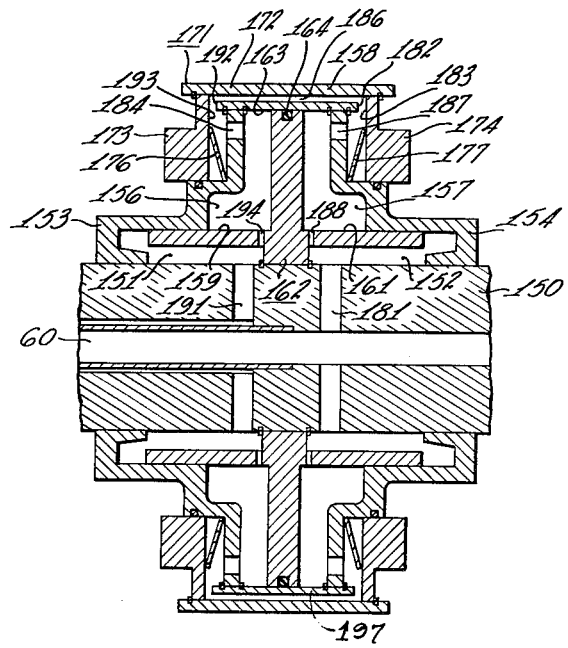
FIG. 6 is a partial section view of a fourth embodiment of this invention.

In the embodiment of this invention illustrated in FIG. 6, the small annular pressure chambers 151, 152 are radially inward from the large pressure chambers 156, 157. The pistons 153, 154, secured in opposite ends of inner cylinder 197 by snap rings, slidably engage a pair of coaxial and axially spaced cylindrical sealing surfaces 159, 161 formed on opposite sides of the reaction member 162 radially inward from cylindrical face 163 of cylinder 197. O-ring 164 insures sliding fluid tight sealing engagement between the outer periphery of reaction member 162 and cylindrical face 163. In addition to inner cylinder 197 and piston elements 153 and 154, which define the inner and outer chambers 151, 152, 156, 157, the cylindrical structure 171 of FIG. 6 includes a radially outer cylinder 172 and end portions 173, 174 adapted to engage a pair of axially spaced clutch packs. The end portions are held in assembly by snap rings carried in outer cylinder 172 and are biased to their neutral position illustrated by a pair of Belleville washers 176, 177.

The cylinder structure 171 of the double acting actuator of FIG. 6 is moved to the right by supplying pressure fluid to small chamber 152 through supply passage 181 in shaft 150. Upon the end portion 174 engaging the clutch pack, pressure rapidly builds up in the small chamber 152 causing washer 177 to deflect and permitting annular sealing surfaces 182, 183 to come into sealing engagement interrupting fluid transfer from large chamber 156 to large chamber 157 by way of opening 184, fluid transfer passage 186 and opening 187. The pressure in chamber 157 builds up to that in chamber 152 upon slight additional flow through restricted opening or bleed passage 188 in reaction member 162 thereby fully engaging the clutch on the right side of the actuator.

When pressure fluid is supplied through supply passage 191 to small chamber 151 and supply passage 181 is connected to the low pressure side of the hydraulic control system, the cylinder structure 171 will move axially to the left relative to the shaft 150, and reaction member 162 secured thereto, bringing end portion 173 into engagement with the clutch or clutch pack on the left side of the actuator. During such axial shifting fluid is transferred from chamber 157 to chamber 156 by way of opening 187, the passage 186 between cylinders 172, 197 and opening 184. Upon engaging the clutch pack at the right side, the pressure in small chamber 151 increases rapidly and the additional force exerted against piston 153 deflects spring or washer 176 to bring annular sealing surface 192 on cylinder element 197 into sealing engagement with sealing surface 193 on end portion 173 thus interrupting fluid transfer and permitting equalization of pressure in chambers 151, 156. Bleed passage 194 permits such equalization of pressure.

An important advantage of the present invention lies in the reduced resistance to fluid transfer from one large pressure chamber to the other during the time when fluid transfer is permitted. In fluid transfer clutch actuators heretofore suggested, fluid transfer occurred through a central opening or a plurality of openings in the reaction member or members spaced radially inwardly from the outer periphery thereof. Thus much of the fluid being transferred had to be forced radially inwardly in opposition to the centrifugal force acting on the transferred fluid. As is obvious upon reference to the illustrated invention, fluid transfer occurs through a passage at the radially extreme portion of the actuator. Thus fluid transfer occurs in the embodiments of the present invention with the least opposition to the centrifugal force acting upon the transferred fluid.

The embodiments of the invention in which an exclusive property or privilege is claimed are defined as follows:

1. A double acting fluid transfer type actuator for a pair of axially spaced clutches interposed between a shaft and gearing mounted thereon, comprising:
   an actuating cylinder mounted coaxially on said shaft and having axially opposite ends shiftable therewith between positions of engagement with said clutches,
   an annular reaction member within said cylinder mounted on and secured against axial movement relative to said shaft and dividing the interior of said cylinder into a pair of large pressure chambers,
   walls within said cylinder radially outwardly of said reaction member defining a cylindrical face in sliding fluid sealing engagement with the radially outer periphery of said reaction member and defining an axially exending fluid transfer passage between said large pressure chambers independent of said shaft and reaction member,
   a pair of axially spaced and radially outward facing cylindrical surfaces formed on opposite sides of said reaction member radially inwardly from said cylindrical face,
   annular pistons disposed between said cylindrical face and said cylindrical surfaces, respectively, defining therewith a pair of small pressure chambers, each of said pistons being shiftable axially outwardly relative to said cylinder from a position of fluid transfer to a position of sealing engagement with one of said ends of said cylinder in which fluid transfer between said large pressure chambers is prevented and
   means biasing said annular pistons to their fluid transfer position in which free flow of fluid is permitted between said large pressure chambers through said fluid transfer passage.

2. The structure set forth in claim 1 and further comprising complementary pairs of annular sealing surfaces formed on said annular pistons and cylinder establishing sealing engagement with one another when said annular pistons are shifted to said positions of sealing engagement with the ends of said cylinder.

3. The structure set forth in claim 2 wherein said sealing surfaces are in axially confronting relation to one another.

4. The structure set forth in claim 3 and further comprising a pair of fluid supply passages in said reaction member connected to said small pressure chambers, respectively, and restricted flow bleed passages in said reaction member extending between said supply passages and said large pressure chambers, respectively.

5. A double acting fluid transfer type actuator for a pair of axially space clutches interposed between a shaft and gearing mounted thereon, comprising:
- an actuating cylinder mounted coaxially on said shaft and having axially opposite ends shiftable therewith between positions of engagement with said clutches,
- an annular reaction member within said cylinder mounted on and secured against axial movement relative to said shaft and dividing the interior of said cylinder into a pair of large pressure chambers;
- walls within said cylinder defining a cylindrical face in sliding fluid sealing engagement with the radially outer periphery of said reaction member and defining an axially extending fluid transfer passage between said large pressure chambers independent of said reaction member,
- a pair of axiall spaced and radially outward facing cylindrical surfaces formed on said reaction member radially inwardly from said cylindrical face,
- a first annular piston disposed between said cylindrical face and one of said cylindrical surfaces and presenting an annular sealing surface in fluid sealing engageable relation to one of said ends,
- a second annular piston disposed between said cylindrical face and the other of said cylindrical surfaces and presenting an annular sealing surface in fluid sealing engageable relation to the other of said ends,
- means biasing said annular pistons to positions permitting free flow of fluid between said large pressure chambers through said fluid transfer passage,
- said cylindrical wall, reaction member and annular pistons forming a small pressure chamber on each of the axially opposite sides of said reaction member,
- said annular pistons moving axially into sealing engagement with said ends, upon the fluid pressure in said small pressure chambers producing an axial force on the adjacent piston greater than the forces acting thereon in the axially opposite direction, thereby interrupting fluid transfer between said large pressure chambers through said fluid transfer passage and
- bleed means between said small and large pressure chambers, respectively, permitting equalization of pressure of fluid in said small and large chambers on corresponding sides of said reaction member after fluid transfer through said fluid transfer passage is interrupted.

6. A double acting fluid transfer type clutch actuator comprising:
- a shaft adapted to carry a pair of axially spaced clutch packs,
- a pair of radially inner and outer cylinders in coaxial relation to said shaft
- a clutch engaging piston member between each of the axially opposite ends of said outer cylinder and said shaft,
- an annular reaction member secured coaxially on said shaft against axial movement relative thereto and dividing the interior of said actuator into a pair of large chambers on axially opposite sides thereof,
- sealing means between said reaction member and said inner cylinder,
- a pair of axially spaced cylindrical surfaces formed on said reaction member on axially opposite sides of said sealing means and radially inwardly from said inner cylinder,
- a pair of annular piston elements operatively interposed between said inner cylinder and said cylindrical surfaces, respectively, on opposite sides of said sealing means and presenting sealing surfaces on their axially outer ends in confronting relation to said piston members, respectively, and
- means biasing said annular piston elements axially toward one another,
- said cylinders and piston elements defining a fluid transfer passage between said large chambers,
- said inner cylinder, reaction member and piston elements defining a pair of small chambers on opposite sides of said sealing means and radially outwardly from said large chambers, and
- one of said piston elements moving axially into engagement with one of said piston members thereby cutting off fluid transfer between said large chambers upon the pressure in the associated small chamber becoming sufficiently great to overcome forces resisting such axial movement of said one piston element.

7. A double acting hydraulic actuator for selectively engaging a pair of axially spaced clutch packs interposed between a shaft and gearing mounted thereon, comprising:
- an actuating cylinder mounted coaxially on said shaft and having axially opposite ends shiftable axially therewith between positions of engagement with said clutch packs,
- an annular reaction member within said cylinder mounted on and secured against axial movement relative to said shaft and dividing the interior of said cylinder into a pair of large pressure chambers,
- a cylindrical wall coaxial to and spaced radially inward from said cylinder in axially movable relation to and in sliding sealing engagement with said reaction member,
- a pair of axially spaced and radially outward facing cylindrical surfaces formed on said reaction member radially inwardly from said cylindrical wall,
- a first annular piston disposed between said cylindrical wall and one of said cylindrical surfaces and presenting an annular sealing surface in fluid sealing engageable relation to one of said ends,
- a second annular piston disposed between said cylindrical wall and the other of said cylindrical surfaces and presenting an annular sealing surface in fluid sealing engageable relation to the other of said ends,
- means biasing said annular pistons to retracted positions wherein said sealing surfaces are spaced from said ends thereby permitting free flow of fluid between said large pressure chambers,
- said cylindrical wall, reaction member and annular pistons forming a small pressure chamber on each of the axially opposite sides of said reaction member,
- one of said annular pistons moving axially upon the pressure in its adjacent small pressure chamber exceeding a predetermined pressure rise, resulting from engagement of the adjacent clutch pack, thereby cutting off fluid transfer between said large pressure chambers and
- bleed means between said small and large pressure chambers, respectively, permitting equalization of pressure of fluid in said small and large chambers on corresponding sides of said reaction member.

8. A double acting fluid transfer type actuator for a pair of axially spaced clutches interposed between a shaft and gearing mounted thereon, comprising:
- an annular reaction member mounted coaxially on and secured against axial movement relative to said shaft
- a pair of radially spaced inner and outer cylinders circumferentially surrounding said reacting member and defining an axially extending fluid transfer passage independent of said reaction member,
- said cylinders being coaxial to and axially shiftable relative to said shaft,
- a cylindrical face on said inner cylinder in sliding sealing engagement with said reaction member,
- a pair of coaxial cylindrical surfaces formed on opposite sides of said reaction member in coaxial relation with said shaft and spaced radially inwardly from said cylindrical face,
- end portions on axially opposite ends of said radially outer cylinder shiftable therewith between positions of engagement with said clutches, a pair of pistons in said inner cylinder in axially confronting relation to said end portions, respectively, and having sliding sealing engagement with said cylindrical surfaces, respectively, to separate a small pressure chamber from a large pressure chamber at each side of said reaction member, biasing means operatively interposed between said inner and outer cylinders urging the latter to assume a neutral position in which fluid transfer is permitted between said large chambers, fluid transfer between said large chambers being interrupted upon predetermined relative movement between said pistons and end portions, fluid supply passages in said shaft in fluid communication with said small chambers, respectively, and means defining a relatively restricted opening between one of said small chambers and the large chamber on the same side of the reaction member and defining a relatively restricted opening between the other of said small chambers and the other large chamber.

9. A double acting fluid transfer type actuator for a pair of axially spaced clutches interposed between a shaft and gearing mounted thereon, comprising:

an outer cylinder mounted in coaxial relation to said shaft and having axially opposite ends shiftable therewith between positions of engagement with said clutches, an annular reaction member within said cylinder mounted on and secured against axial movement relative to said shaft, a cylindrical element spaced radially inwardly from and coaxial to said outer cylinder to define a fluid transfer passage therewith and having a cylindrical face in sliding fluid sealing engagement with the radially outer periphery of said reaction member, a pair of axially spaced and radially outward facing cylindrical surfaces formed on opposite sides of said reaction member radially inwardly from said cylindrical face, annular piston elements in opposite ends of said cylindrical element and having cylindrical surfaces complementary to and in axially sliding engagement with said cylindrical surfaces of said reaction member dividing each of the axially opposite ends of said actuator into small and large pressure chambers, means biasing said outer cylinder and said piston elements to a neutral position in which fluid transfer between said large chambers is permitted, an annular fluid sealing surface formed adjacent each axial end of said fluid transfer passage on one of said cylindrical and piston elements in coaxial relation to said shaft, and an annular fluid sealing face formed on each of said ends of said outer cylinder in complementary sealing relation to said annular fluid sealing surfaces, fluid transfer between said large chambers being interrupted upon sufficient relative movement occurring between one of said piston elements and the adjacent outer cylinder end to bring one of said annular fluid sealing surfaces into engagement with said one of said annular fluid sealing faces.

References Cited by the Examiner

UNITED STATES PATENTS

| 2,632,544 | 3/53 | Hockert | 192—87 |
| 2,979,176 | 4/61 | Voth | 192—87 |
| 3,098,549 | 7/63 | Schick et al. | 192—87 |
| 3,106,999 | 10/63 | Snoy | 192—87 |

DAVID J. WILLIAMOWSKY, *Primary Examiner.*